United States Patent [19]

Hake et al.

[11] 4,281,719

[45] Aug. 4, 1981

[54] SPRING LOADED FIELD CULTIVATOR TOOL SUPPORT

[75] Inventors: Kenneth A. Hake; Nelson J. Palen, both of Tipton, Kans.

[73] Assignee: Kent Manufacturing Co., Inc., Tipton, Kans.

[21] Appl. No.: 93,399

[22] Filed: Nov. 13, 1979

Related U.S. Application Data

[63] Continuation-in-part of Ser. No. 87,016, Oct. 22, 1979.

[51] Int. Cl.³ ............................................. A01B 61/04
[52] U.S. Cl. ...................................... 172/710; 29/509; 29/526 R
[58] Field of Search ........................ 172/705–710, 172/711, 763, 773, 775, 264, 265, 643; 29/509, 514

[56] References Cited

U.S. PATENT DOCUMENTS

| | | | |
|---|---|---|---|
| 1,140,564 | 5/1915 | Bawel | 172/643 |
| 1,567,035 | 12/1925 | Carr | 172/708 |
| 1,616,359 | 2/1927 | Fell | 172/643 |
| 2,739,518 | 3/1956 | Rolf | 172/710 |
| 3,084,749 | 4/1963 | Anderson | 172/268 |
| 3,098,529 | 7/1963 | Wade | 172/710 |
| 3,258,076 | 6/1966 | Groenke | 172/710 |
| 3,493,055 | 2/1970 | Van Peursem | 172/708 |
| 3,606,928 | 9/1971 | Quanbeck | 172/705 |
| 3,634,925 | 1/1972 | Loo | 29/509 |
| 3,700,038 | 10/1972 | Essex | 172/705 |
| 3,700,039 | 10/1972 | Essex | 172/705 |
| 3,782,481 | 1/1974 | Quanbeck | 172/710 X |
| 4,143,718 | 3/1979 | Quanbeck | 172/705 |

OTHER PUBLICATIONS

New Kent Heavy Duty Field Cultivators, 4000H Series 5000H, received in PTO Sep. 26, 1979, Kent Mfg. Co., Tipton, Ka.
New Generation of Kent Field Cultivators, 6000 series 7000, Kent Mfg. Co., Tipton, Ka. Received in PTO Sep. 26, 1979.
Wil-Rich Mounted Coil Tooth Harrows for Field Cultivators & Chisel Plows, Wil-Rich Inc., Wapheton, N.D.
Bush Hog Soil Hog Advertising Brochure of Allied Products Corp., Selma, Al., Received in PTO Sep. 29, 1979.

*Primary Examiner*—Richard J. Johnson
*Attorney, Agent, or Firm*—Fishburn, Gold and Litman

[57] ABSTRACT

A mounting apparatus for pivotally attaching a cultivator tool to a frame member of mobile farm equipment comprising an upright support bracket, an extension spring, and a tool holder member which is pivoted with respect to the bracket. The tool holder member has a web portion and side flange portions. Near the shank receiving end of the tool holder member the flange portions are folded under the shank to form a shank receiving socket which snugly holds the shank and prevents transverse movement thereof relative to the holder member. The spring is also pivotally attached by a connector member to the holder member. The tool holder member includes a cutout portion in the web thereof such that a pair of rims are formed which extend inwardly from the flanges. The connector member includes a sleeve extending between the flanges and having a pair of external cylindrical surfaces near each end thereof which engage the rims of the tool holder member. The sleeve also includes a central bore which is coaxial with the cylindrical surfaces thereof and which receives a pivot pin secured in coaxial apertures in the side flanges of the tool holder.

7 Claims, 7 Drawing Figures

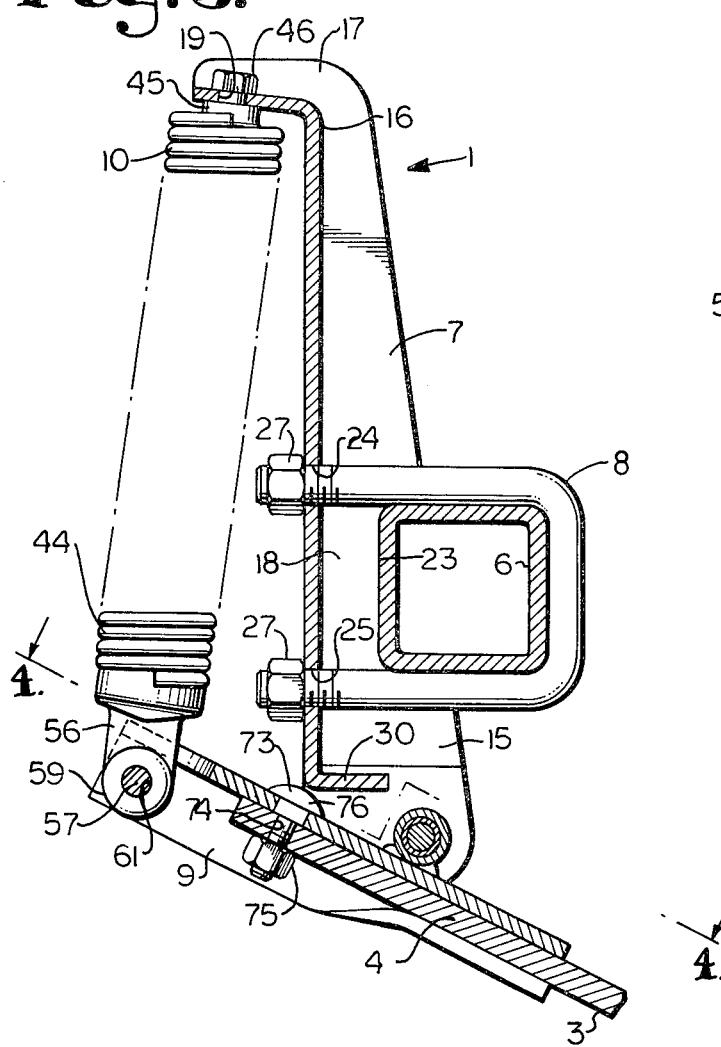
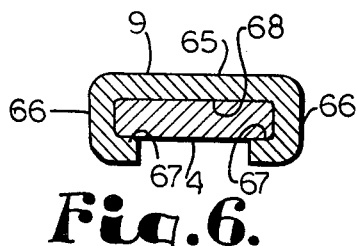
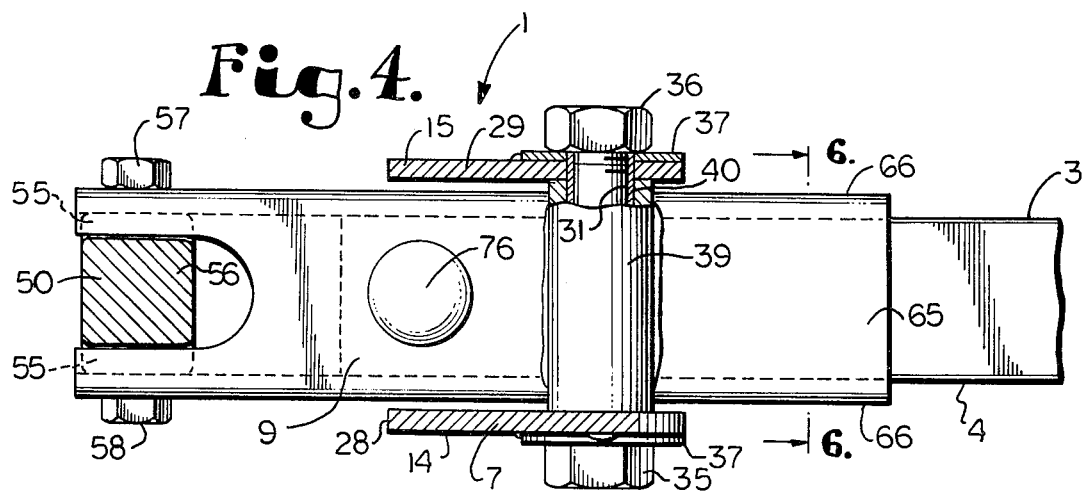

4,281,719

SPRING LOADED FIELD CULTIVATOR TOOL SUPPORT

CROSS-REFERENCE TO RELATED APPLICATIONS

The present application is a continuation-in-part of United States application Serial No. 87,016, filed Oct. 22, 1979, entitled FIELD CULTIVATOR TOOL SUPPORT MOUNTING APPARATUS.

BACKGROUND OF THE INVENTION

The present invention relates to support apparatus for pivotally attaching soil working cultivator tools to a mobile agriculture frame.

There are in the prior art a large number of devices for pivotally attaching cultivator tools to a mobile frame member; however, there have been some deficiencies associated with such devices which substantially reduce the longevity thereof through wear on specific parts. In particular, a single pivot pin has a tendency to wear heavily on bearing surfaces associated therewith.

In addition, many of the prior art devices fail to fully protect the shank and thereby lead to breakage of such shanks. In particular prior shank holders often do not wrap around the shank, so that the shank is held securely by the holder without regard to the direction of movement of the frame member. This wrap around feature is especially important in protecting the shank when the tool is moving backwards, that is, opposite the normal earth working direction or sideways. Those prior art devices which have surrounded the shank have typically been relatively complex requiring welding or the like to form a rectangular sleeve. Also, the conventional methods of clamping the tool supports to the frame member have often produced weak clamping structures to which access for repair and relocation on a frame member is difficult to obtain.

OBJECTS OF THE INVENTION

Therefore, the principal objects of the present invention are: to provide an improved structure for mounting a spring cultivator tool on an agricultural tool bar; to provide such a structure including particularly a shank holder member for operative pivotal connection of the shank of a spring tool to a bracket secured to the tool bar and providing a connection to a return spring urging the spring tool toward ground engagement; to provide such a shank holder having an integral socket which receives and reinforces the shank of the spring tool with respect to movement thereof in any direction; to provide such a shank holder which may be manufactured by relatively simple stamping and bending of sheet metal; to provide such a shank holder comprising a one piece channel shaped member having rear portions of depending flanges thereof folded under the web so as to form the shank receiving socket; to provide such a shank holder having a cutout in the front end of the web for providing clearance for a lower return spring connector and defining rims on opposite sides for engagement by outer bearing surfaces of cylindrical projections of the return spring connector to provide greater bearing surface for the pivotal connection of the return spring to the shank holder; and to provide such a shank holder which is economical to manufacture, which is durable and capable of long operating life, which reduces tool shank failures, and which is particularly well adapted for the proposed use thereof.

Other objects and advantages of this invention will become apparent from the following description taken in connection with the accompanying drawings wherein are set forth, by way of illustration and example, certain embodiments of this invention.

SUMMARY OF THE INVENTION

A tool mounting apparatus adapted for mounting a field cultivator tool on an agricultural frame member includes: an elongate channel shaped support adapted for clamping to said frame member by a U-bolt such that the U-bolt is easily accessible for varying the position of the apparatus or repair; a tool holder adapted for receiving a shank of a tool and being pivotally attached to a lower portion of the bracket; and a biasing member connected at opposite ends thereof to an upper portion of the bracket and the shank holder respectively. The tool holder comprises a channel having a web and substantially downwardly projecting flanges from each side of the web. Rear lower portions of the flanges have lips which generally parallel the web. The web, flanges and lips define a socket for securely holding the tool shank and preventing transverse movement thereof relative to the tool holder. Fastening means prevent traverse movement of the tool shank relative to the tool holder. The tool holder also includes a connector member for pivotally connecting the tool holder to the biasing member and a cutout portion providing sufficient clearance for the connector member to pivot relative to the remainder of the tool holder member. The cutout also defines a pair of rims projecting inwardly opposite one another from the flanges. The connector member includes a pair of trunnions forming an elongate sleeve which extends between the tool holder flanges. The sleeve has a pair of external cylindrical surfaces near each end thereof which pivot upon the rims of the tool holder member. The sleeve also includes a central bore which is coaxial with the cylindrical surfaces thereof and which receives a pivot pin which is secured in coaxial apertures in the side flanges of the tool holder, such that the biasing member and tool holder member pivot relative to one another on both the pivot pin and the engagement of the cylindrical surfaces with the tool holder member rims.

The drawings constitute a part of this specification and include exemplary embodiments of the present invention and illustrate various objects and features thereof.

BRIEF DESCRIPTION OF THE DRAWINGS

FIG. 3 is an enlarged cross-sectional view of the apparatus.

FIG. 4 is a cross-sectional view taken along line 4—4 in FIG. 3.

FIG. 5 is an enlarged fragmentary front elevational view of the spring and tool holder member showing the pivotal interconnection therebetween.

FIG. 6 is a cross-sectional view taken along line 6—6 in FIG. 4.

DETAILED DESCRIPTION OF THE PREFERRED EMBODIMENT

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
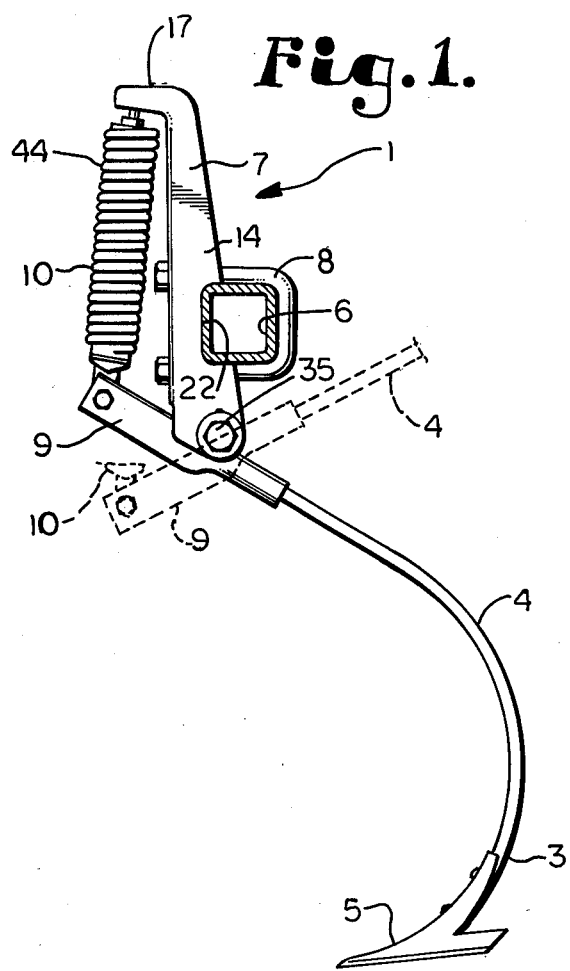
FIG. 1 is a side elevational view of a mounting apparatus embodying the present invention and showing in phantom the tool holder member in an alternative pivoted position.
Figure 2:
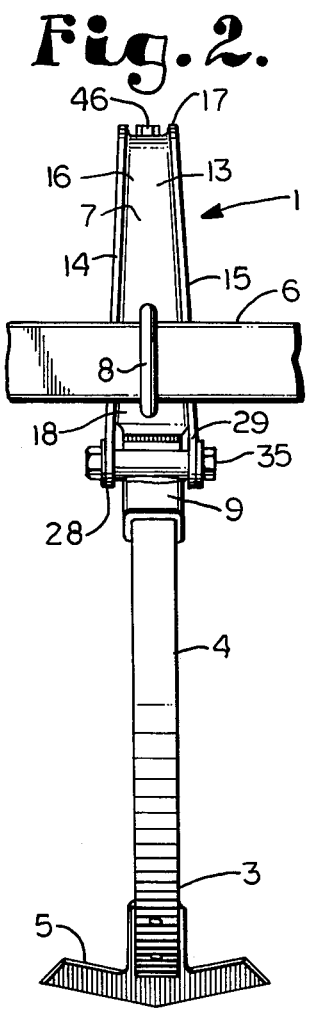
FIG. 2 is a rear elevational view of the mounting apparatus.

For purposes of description herein, the terms "front" and "forward" refer to the left as seen in FIG. 1. The terms "upper", "lower", "right", "left", "rear", "vertical", "horizontal", and derivatives thereof shall relate to the invention as oriented in FIGS. 1 and 2; however, it is to be understood the invention may assume various alternative orientations, except where expressly specified to the contrary.

The reference numeral 1 generally designates a mounting apparatus embodying the present invention for pivotally connecting an agricultural tool 3 having a shank portion 4 and a soil tool 5 to a tool bar or frame member 6 of mobile agricultural equipment (not shown). The mounting apparatus 1 comprises an upright support bracket 7 adapted for clamping by a U-bolt 8 to the tool bar 6, a tool holder member 9 adapted for receiving the agricultural tool shank 4 and being pivotally connected at a medial point therealong to the support bracket 7, and biasing means 10 connected to both the support bracket 7 and tool holder member 9 at locations spaced apart from the interconnection of the tool holder member 9 and support bracket 7 for urging the soil tools into engagement with the ground.

In the illustrated embodiment, the support bracket 7 is a one piece generally channel-shaped member which comprises a substantially flat front or web 13 and a pair of flange members 14 and 15 rearwardly extending from opposite sides of the web 13. The web 13 and flange members 14 and 15 together form a channel 16. An upper section 17 of the channel 16 is bent forwardly at an angle almost perpendicular to a remaining lower portion of the channel 18, while retaining the channel integrity thereof. The upper section 17 forms a lug for attaching the support bracket 7 to the biasing means 10. A fastener receiving aperture 19 is centered in the web of the channel upper sections 17. The flange members 14 and 15 and the web 13 of the channel 16 are tapered so as to be wider at the bottom thereof. Each of the flange member 14 and 15 have associated therewith a slot 22 and 23 respectively, which extend inwardly from the rearward periphery thereof. The slots 22 and 23 are coextensive and horizontally spaced. Each of the slots 22 and 23 are shaped so as to snugly receive a frontward portion of the tool bar 6 therein. The web 13 of the vertically aligned channel lower portion 18 has a pair of vertically spaced apertures 24 and 25. Each of the apertures 24 and 25 receive opposite ends of the U-bolt 8. The U-bolt 8 encircles the tool bar 6 so as to securely hold the latter in the slots 22 and 23 and is fastened to the support bracket 7 by a pair of nuts 27 or the like on the front side of the web 13. In this manner, the connection of the tool bar 6 to the support bracket 7 is very stable and strong while still allowing easy access to the nuts 27 for movement of the apparatus 1 relative to the tool bar 6 to a repair of thereof.

The lower end of the support bracket 7 includes a tab portion 30 extending rearwardly and between the flange members 14 and 15 so as to provide stability thereto. The tap portion 30 of the illustrated embodiment is at an angle in the nature of 90° with respect to the web 13. Also on the lower end of the support bracket 7 is a pair of ears 28 and 29, each depending from the flange members 14 and 15 respectively. The ears 28 and 29 are angled with respect to the flange member 14 and 15 so as to be parallel and each includes an aperture 31 which apertures 31 are coaxially aligned. The apertures 31 receive a pivot pin or bolt 35 having a suitable fastener such as nut 36 and washers 37 to maintain the bolt 25 therein.

Coaxially mounted on the bolt 35 is pivot means 38 for pivotally connecting the support bracket 7 to the tool holder member 9 about a transverse substantially horizontally axis. The pivot means includes a sleeve 39 and an inner bushing 40 both coaxially mounted on the bolt 35 and extending between the ears 28 and 29. The bolt 35 is rotatable within the bushing 40. The sleeve 39 is secured to the top of the tool holder member 9 by suitable means such as the illustrated welding.

The illustrated biasing means 10 comprises a helical coil extension or return spring 44 or other suitable resilient member. A plug 45 which is threaded and mates with the interior of the spring 44 is attached to the connection lug 17 by a bolt 46 which passes through the aperture 19. The bolt 46 is adjustable so as to vary tension upon the spring 44. The spring 44 is pivotally attached to the tool holder member 9 by pivot means such as a connector member 50, as shown in FIG. 4. The connector member 50 includes an upwardly extending plug 51 interior of the spring 44. The plug 51 has threads 52 which mate with the interior of the spring 44 thereby securing the spring 44 to the connector member 50.

The connector member 50, as illustrated, includes a pair of interconnected coextensive and coaxial trunnions 55. An arm, central or projecting member 56 extends upwardly from between the trunnions 55 and is fixedly attached to the plug 51. A bore 61 extends through and is coaxial with the center of both of the trunnions 55 and receives a pivot pin or bolt 57 held therein by a suitable fastener such as a nut 58. The bolt 57 has a substantially horizontal and transverse axis. The trunnions 55 form a sleeve 59 about the bolt 57. The sleeve 59 is rounded or cylindrical near opposite external ends or surfaces 60 thereof. The surfaces 60 are coaxial with the bolt 57, and define bearing surfaces.

Figure 7:
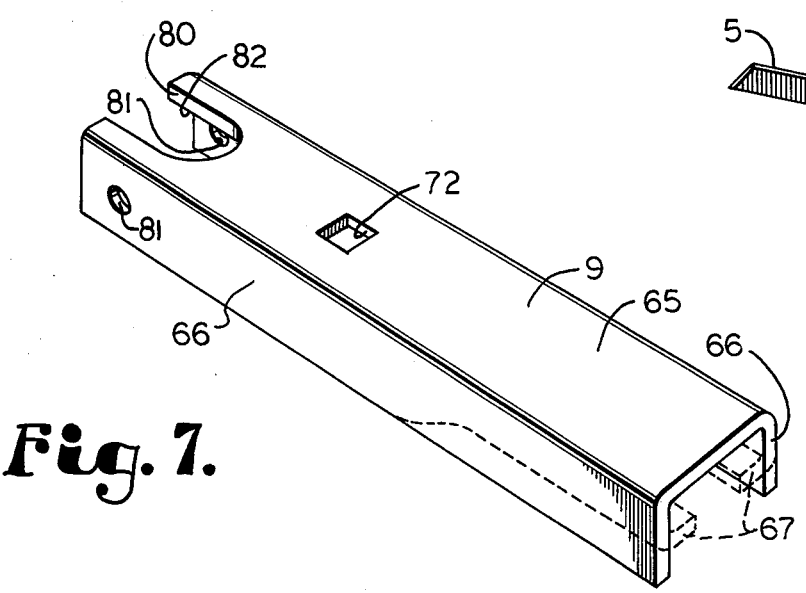
FIG. 7 is an enlarged perspective view of the tool holder member before formation of the lips thereof and showing in phantom the lips in formed positions.

The tool holder member 9, as is best seen in FIG. 7, is channel shaped having an elongate web 65 and a pair of depending flanges 66 depending from opposite sides of the web. As shown by phantom lines in FIG. 7, a lower portion of each of the flanges 66 is bent or folded inwardly near the rear end of the tool holder member 9 so as to form lips 67. The web 65, flanges 66, and lips 67 together define a socket 68 for snugly receiving the tool shank 4.

An aperture 72 is formed medially along and transversely centered in the web 65. Fastening or securing means such as a suitable bolt 63 or the like extends through the tool holder aperture 72 and a mating aperture 74 in the tool shank 4 and is secured therein by a suitable fastener such as nut 75. The bolt 63 prevents traverse or longitudinal movement of the shaft 4 relative to the tool holder member 9. A head 76 of the bolt 73 is positioned so as to engage a lower end of the support bracket 7 and thereby function as a stop to limit pivotal movement of the tool holder member 9 with respect to the support bracket 7.

A cutout 80 is formed in the tool holder member web 65 near a frontward end thereof. An aperture 81 is formed in each of the flanges 66 beneath the cutout 80. The apertures are coaxial and approximately laterally centered in the flanges 66. Each of the apertures 81 receive and hold one end of the bolt 57 therein. In this manner the apertures 81 or alternatively the bore 61 provide bearing surfaces upon which the bolt 57 is free to pivot or rotate. The apertures 81 are spaced from the web 65 a sufficient distance such that the ends of the sleeve surfaces 60 will just rest or be slightly below the lower side of the web 65. The cutout 80 is such that lips, projections, shoulders or rims 82 are formed on either side of the web 65 above the sleeve surface 60. The rims 82 extend inwardly from associated flanges 66 and are laterally spaced opposite each other. The cutout 80 also allows relatively free movement of the arm 56 through a substantial arc in a transverse plane so as to provide clearance to the connector member 50 relative to the tool holder member 9. The connector member trunnions 55 preferably abut associated flanges 66 and slidably engage both the associated flanges 66 and rims 82. Normally thrust of the spring 44 is exerted against the tool holder member 9 both at the location whereat the surfaces 60 and the rims 82 respectively engage and whereat the bolt 57 engages either the apertures 81 or the bore 61 or both.

The construction of the tool holder member 9 is simple and same can be produced by simple stamping of sheet metal stock and thereafter suitable braking or bending steps. The simple structure of the tool holder member 9 requires no complicated manufacturing steps such as casting, welding or the like. In addition the wrap around nature of the tool holder member socket 68 snugly holds the tool shank 4 and prevents sideway movement thereof relative to the mounting apparatus 1 even when moving backwards or sideways.

In use the mounting apparatus 1 is utilized to attach the agricultural cultivator tool 3 to mobile farm equipment frame member or tool bar 6, as illustrated in FIG. 1. The support bracket 7 provides exceptionally stable support to a mounting apparatus 1 even though same is attached to the tool bar 6 by only a single U-bolt 8. As is illustrated in FIG. 1 in phantom line and in solid line views, the agricultural tool 3 pivots relative to the support bracket 7 on the pivot bolt 35, such that the soil tool 5 can be raised above obstructions such as rocks, etc. to provide obstacle clearance. The spring 44 maintains constant force on the tool holder member 9 so as to lever and urge the soil tooth 5 toward ground engagement and into a predetermined depth in the soil which is being cultivated thereby. The shank 4 of the tool 3 is snugly held within the socket 68 which prevents sideways movement thereof while the bolt 73 secures the shank 4 to the tool holder member 9 and prevents the former from coming out of the socket 68. In this manner the tool shank 4 is less susceptible to breakage or inelastic bending when the agricultural equipment is moving rearwardly or sidewardly. The connector member 50 allows the tool holder member 9 to rotate or pivot relative to the spring 44 while maintaining a sound interconnection therebetween. In particular the spring thrusts against the tool holder member both through the pivot bolt 57 and the bearing surfaces 60. In this manner the interconnection of the spring 44 and tool holder member 9 is less susceptible to wear as when a single bolt would form the pivotal connection. Preferably, the outer ends of the surfaces 60 extend very near to the flanges 66 which even further prevents undesired movement of the connector member 50 relative to the tool holder 9.

Although part of the interconnection between the connector member 50 and the tool holder member 9 has been shown as a pivot bolt 57 received in the bore 61, it is foreseen that the bore 61 could easily be threaded and individual bolts threaded into same so as to extend outwardly from each side thereof to engage the apertures 81. In addition other means of providing this pivotal interconnection are foreseen. It is also foreseen that the positioning of the spring 44 relative to the tool holder member 9 can be substantially varied within the scope of the present invention.

It is to be understood that while certain embodiments of the present invention have been illustrated and described herein, it is not to be limited to the specific forms or arrangement of parts herein described and shown.

Having thus described the invention, what is claimed and desired to secure by Letters Patent is:

1. A shank holder for pivotally connecting the shank of a spring cultivator tool to bracket means on an agricultural tool bar and for operative connection of said shank to tool biasing means for urging the tool toward ground engagement; said shank holder comprising in combination:

(a) an elongated one-piece sheet metal channel-shaped shank holder member having a central web and downwardly depending side flanges;

(b) first pivot means positioned medially along and connecting said holder member to said bracket means; said first pivot means allowing rotation of said holder member with respect to said bracket means about a first transverse horizontal axis of said holder member;

(c) second pivot means connecting said biasing means to said holder member at a location spaced apart from said first pivot means; said second pivot means allowing relative rotation between said biasing means and said holder member about a second transverse horizontal axis of said holder member;

(d) fastening means on a medial portion of said web for fastening said tool shank to said shank holder member such that movement of said shank longitudinally along said holder member is prevented; and (e) rearward lip portions of said side flanges being folded under said web to define a shank receiving socket; said lip portions being spaced apart from and generally parallel to each other and spaced rearwardly from said fastening means so as to allow access to said fastening means; said socket receiving said shank snugly therein and preventing transverse movement of said received shank relative to said holder member; and (f) wherein said second pivot means includes:
 (a) a pivot pin member;
 (b) a pivotal connector member adapted for attaching to said biasing means; said connector member including:

(1) a pair of coaxial trunnions each having an external cylindrical bearing surface thereon and being rotatable about said second axis; and wherein:
(2) said pivot pin member is coaxial with said trunnions and extends outwardly on each side of said pair of trunnions; and wherein:
(g) said holder member includes:
(1) a cutout in the web of said holder member;
(2) said cutout defining a pair of transversely extending side shoulders projecting inwardly from said side flanges and providing clearance for pivoting said connector member with respect to said holder member;
(3) a pair of flange apertures; one of said aperture being positioned in each of said side flanges respectively and receiving said pivot pin member; said apertures being coaxially aligned; and
(4) said connector member pivoting on said pivot pin member relative to said shank holder member, each of said trunnion bearing surfaces engaging one of said transversely extending side shoulders respectively, thereby providing a bearing surface between said trunnions and said holder member, whereby additional strength is provided for the pivotal connection between said biasing means and said holder member and whereby said pivot pin member is less likely to wear on said flange apertures thus increasing the life expectancy of said shank holder.

2. The shank holder according to claim 1 wherein:
(a) said shank holder member has a one-piece construction adapted for being formed by bending of suitably shaped planar sheet metal.

3. A tool mounting apparatus for mounting a field cultivator tool on a frame member of mobile farm equipment, said apparatus comprising:
(a) an upright member having a front plate and parallel side plates outwardly extending from opposite sides of the front plate; said side plates having aligned notches on the outer rear edges thereof adapted for receiving said frame member;
(b) a U-bolt securing said frame member to said upright member; said front plate having a pair of apertures therein for receiving said U-bolt; said U-bolt being secured to said upright member by fastener means on the side of said front plate opposite the side thereof from which said side plates extend;
(c) a tool holder member comprising a channel having a web and a pair of side flanges depending from said web; a portion of said channel being adapted for receiving a shank of said tool and another portion having a pivot pin receiving aperture in each of said flanges, the apertures being coaxially aligned; said web including a cutout portion above said apertures; said cutout portion defining a pair of side shoulders projecting inwardly from said flanges and each shoulder being positioned above a respective one of said apertures said shoulders having downwardly facing surfaces;
(d) fastening means securing said shank in said channel;
(e) pivot means positioned medially along and connected to said tool holder member and to a lower portion of said upright member; said pivot means allowing rotation of said tool holder member with respect to said upright member about a first horizontal axis; said first axis being transverse relative to said tool holder member;
(f) an extension spring attached at one end thereof to an upper end of said upright member and pivotally connected at an opposite end thereof to said tool holder member at a location spaced apart from said pivot means; said spring urging said tool downward into engagement with the ground;
(g) a pivot pin received in and extending between said tool hold member apertures; and
(h) a connector member pivotally connecting said tool holder member to said spring; said connector member comprising an elongate sleeve having a central bore; said bore receiving said pivot pin such that said connector is pivotal thereon; said sleeve having a projecting member extending outwardly from a medial portion thereof for attachment to said spring; said sleeve having a pair of external cylindrically shaped bearing surfaces positioned so as to engage said tool holder member downwardly facing surfaces of said shoulders when said connector member pivots about said pivot pin, whereby thrust from the pivotal interconnection of said spring and said tool holder member is exerted against the engagement of each of said apertures by said pivot pin and against the engagement of said shoulders by said bearing surfaces respectively; said tool holder member cutout providing sufficient clearance for said connector member to rotate on said pivot pin.

4. In a shank holder for pivotally connecting the shank of a spring cultivator tool to bracket means on an agricultural tool bar and for operative connection of said shank to biasing means, the biasing means urging the tool toward ground engagement while the tool is working soil and allowing deflection of said tool for obstacle clearance; said shank holder comprising:
a channel shaped elongate holder member including a web and depending side flanges adapted for receiving said shank abuttingly against said web and between said side flanges;
securing means for attaching said shank to said holder member;
first pivot means for connecting said holder member to said bracket means and allowing said holder member to rotate about a first generally horizontal transverse axis; and
second pivot means for connecting said holder member to said biasing means and spaced apart from said first pivot means; said second pivot means also allowing said holder member to rotate about a second generally horizontal transverse axis;
the improvement in said shank holder being wherein said second pivot means includes:
(a) a pivot pin;
(b) a pivotal connector member adapted for fixedly attaching to said biasing means; said connector member including:
(1) a sleeve extending between said flanges and having a pair of external cylindrical bearing surfaces near each end thereof; said sleeve having an internal bore which receives said pivot pin; said pivot pin extending outwardly from each end of said sleeve;
(2) an arm attached to and extending outwardly from a medial portion of the exterior of said sleeve and adapted for attachment to said biasing member; and wherein:

(c) each of said holder member flanges includes an aperture; said apertures being coaxially aligned and receiving said pivot pin such that said connecting member sleeve bore is also coaxial therewith; and
(d) said holder member web including at least one transversely extending projection therefrom suitable for engagement by each of said sleeve cylindrical bearing surfaces, such that said sleeve bearing surfaces engage said transversely extending projection and pivot thereon when said holder member is also pivoting relative to said connector member on said pivot pin.

5. The shank holder according to claim 4 wherein:
(a) a cutout formed in said web provides clearance for said pivotal connector member to pivot; said cutout defining a pair of side rims extending inwardly along said flanges; said rims comprising said projection engaging and receiving thrust from said sleeve bearing surfaces.

6. A shank holder for pivotally connecting a shank of an earthworking cultivator tool to bracket means on an agricultural tool bar and for operative connection of said shank to a return spring urging said tool toward ground engagement while earthworking and allowing deflection of said tool for obstacle clearance and return thereof to an earthworking position, said shank holder comprising:
(a) a channel member constructed from sheetmetal adapted for receiving at one end thereof the tool shank and including a web with downwardly extending side flanges;
(b) coaxially aligned apertures formed in said flanges adjacent the end of said channel member opposite said tool shank receiving end; said apertures for receiving a pivot pin; said pivot pin for securing a trunnion connector on a lower end of the return spring to said channel member; said trunnion connector having cylindrical external bearing surfaces on each side thereof;
(c) a cutout formed in said web at said opposite end of said channel member, said cutout providing clearance for pivotal movement of said trunnion connector relative to said channel member; said cutout defining side rims each having a downwardly facing bearing surface, each rim bearing surface engaging a respective one of said trunnion connector bearing surfaces;
(d) fastening means in a medial portion of said web adapted for securing said tool shank thereto; and
(e) portions of said flanges at said tool shank receiving end of said channel member being folded under into substantially parallel relation to said web to form a snug enclosure for receiving said shank.

7. A tool mounting apparatus adapted for mounting a field cultivator tool on a field cultivator frame member; said apparatus comprising:
(a) an elongate support adapted for clamping to said cultivator frame member;
(b) a tool holder member constructed from sheet metal adapted for receiving a shank of said tool and pivotally connected at a medial portion therealong to a first end of said support; said tool holder member being channel shaped and having a web portion and flange portions extending outwardly from said web portion; said tool holder member including means for securing said tool shank in said channel, whereby said tool shank portion will not slide longitudinally along said channel; and each of said flanges have lips extending inwardly toward each other along a shank engaging portion thereof; said channel web portion, flange portions and lips wrapping around said tool shank, such that said tool shank will not substantially move in any transverse direction relative to said tool holder member;
(c) a resilient member connected at opposite ends thereof to a second end of said support and to said tool holder member at a position spaced apart from the connection of said tool holder within said support, such that said tool holder member pivots relative to said support and said resilient member biases said tool downwardly; and wherein
(d) said tool holder member and said resilient member are pivotally interconnected by a connecting member having:
(1) a pair of trunnions each having an external cylindrical bearing surface thereon;
(2) a central member attached to said trunnions and to said resilient member;
(3) a central bore coaxial with said bearing surfaces; and
(4) a pivot pin pivotally mounted on the tool holder member flanges and extending therebetween; said pivot pin extending through said bore; and wherein:
(5) said tool holder member includes a pair of transversely extending shoulders upon which said bearing surfaces thrust whenever said connecting member pivots about said pivot pin.

* * * * *